United States Patent
Sutherland

[19]

[11] Patent Number: 6,123,355
[45] Date of Patent: *Sep. 26, 2000

[54] VEHICLE OCCUPANT SAFETY APPARATUS

[75] Inventor: Daniel R. Sutherland, Sterling Heights, Mich.

[73] Assignee: TRW Vehicle Safety Systems Inc., Lyndhurst, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 09/040,857

[22] Filed: Mar. 18, 1998

[51] Int. Cl.⁷ .................................................. B60R 21/22
[52] U.S. Cl. .................................. 280/728.2; 280/730.2; 280/736; 280/735
[58] Field of Search ............................. 280/730.1, 730.2, 280/736, 742, 741, 743.1, 735, 734, 729

[56] References Cited

U.S. PATENT DOCUMENTS

| | | | |
|---|---|---|---|
| 2,834,606 | 5/1958 | Bertrand | 280/730.1 |
| 3,603,535 | 11/1968 | DePolo | 280/730.1 |
| 3,642,303 | 2/1972 | Irish et al. | 280/730.1 |
| 3,897,961 | 8/1975 | Leising et al. | 280/730.1 |
| 5,265,903 | 11/1993 | Kuretake et al. | 210/730.1 |
| 5,362,097 | 11/1994 | Barske | 280/730.1 |
| 5,470,103 | 11/1995 | Vaillancourt et al. | 280/730.1 |
| 5,556,128 | 9/1996 | Sinnhuber et al. | 280/750.2 |
| 5,575,497 | 11/1996 | Suyama et al. | 280/730.1 |
| 5,775,726 | 7/1998 | Timothy et al. | 280/730.1 |
| 5,845,935 | 12/1998 | Enders et al. | 280/743.2 |
| 5,988,735 | 11/1999 | Muller . | |

FOREIGN PATENT DOCUMENTS

| | | |
|---|---|---|
| 0810128 A2 | 12/1997 | European Pat. Off. . |
| 2628815 | 1/1978 | Germany .......................... 280/730.1 |
| 29616904 | 3/1997 | Germany . |
| 19632222 A1 | 2/1998 | Germany . |
| 19650940 A1 | 6/1998 | Germany . |
| 03276844 | 12/1991 | Japan . |
| 9254737 | 9/1997 | Japan . |
| 10119703 | 5/1998 | Japan . |

OTHER PUBLICATIONS

A copy of a Research Disclosure No. XS–000773862, dated Mar. 1998 (pp. 1–4) for INFLATABLE ROOF BLADDER FOR ROLLOVER PROTECTION.

A copy of a Research Disclosure No. XS–0007773872, dated Mar. 1998 (pp. 1–3) for DEPLOYABLE FOAM SYSTEM FOR ROLLOVER PROTECTION.

*Primary Examiner*—Christopher P. Ellis
*Attorney, Agent, or Firm*—Tarolli, Sundheim, Covell, Tummino & Szabo L.L.P.

[57] ABSTRACT

A vehicle occupant safety apparatus (10) for helping to protect an occupant of a vehicle (12) having a roof (46) and a side structure (40) includes a first vehicle occupant protection device (20). The first protection device (20) is inflatable into a position between the side of the occupant's head and the vehicle side structure (40). A first inflation fluid source (14) directs inflation fluid into the first inflatable device to inflate the first inflatable device. A second vehicle occupant protection device (22) is inflatable into a position between the top of the occupant's head and the vehicle roof (46). A second inflation fluid source (16) is actuatable independently of the first inflation fluid source for directing inflation fluid into the second inflatable device to inflate the second inflatable device. Control means (30, 32) is responsive to at least one sensed vehicle condition for selectively actuating the second inflation fluid source (16) at a predetermined period of time after actuation of the first inflation fluid source (14).

29 Claims, 3 Drawing Sheets

VEHICLE OCCUPANT SAFETY APPARATUS

BACKGROUND OF THE INVENTION

The present invention relates to a vehicle occupant safety apparatus and, in particular, to a vehicle safety apparatus for helping to protect an occupant of a vehicle having a roof and a side structure.

SUMMARY OF THE INVENTION

The present invention is a vehicle occupant safety apparatus for helping to protect an occupant of a vehicle having a roof and a side structure. The apparatus includes a first vehicle occupant protection device inflatable into a position between the side of the occupant's head and the vehicle side structure, and an actuatable first inflation fluid source for directing inflation fluid into the first inflatable device to inflate the first inflatable device. The apparatus includes a second vehicle occupant protection device inflatable into a position between the top of the occupant's head and the vehicle roof, and a second inflation fluid source actuatable independently of the first inflation fluid source for directing inflation fluid into the second inflatable device to inflate the second inflatable device. The apparatus further includes control means responsive to at least one sensed vehicle condition for selectively actuating the second inflation fluid source at a predetermined period of time after actuation of the first inflation fluid source.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DESCRIPTION OF PREFERRED EMBODIMENTS

Figure 1:
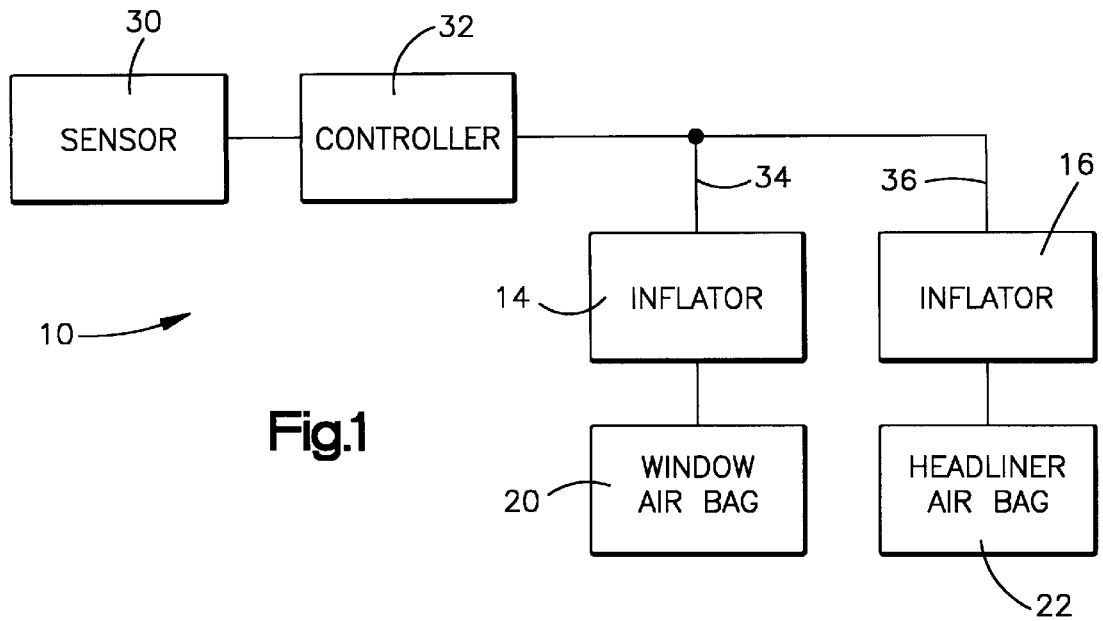
FIG. 1 is a schematic block diagram of a vehicle occupant safety apparatus in accordance with the present invention.
Figure 2:
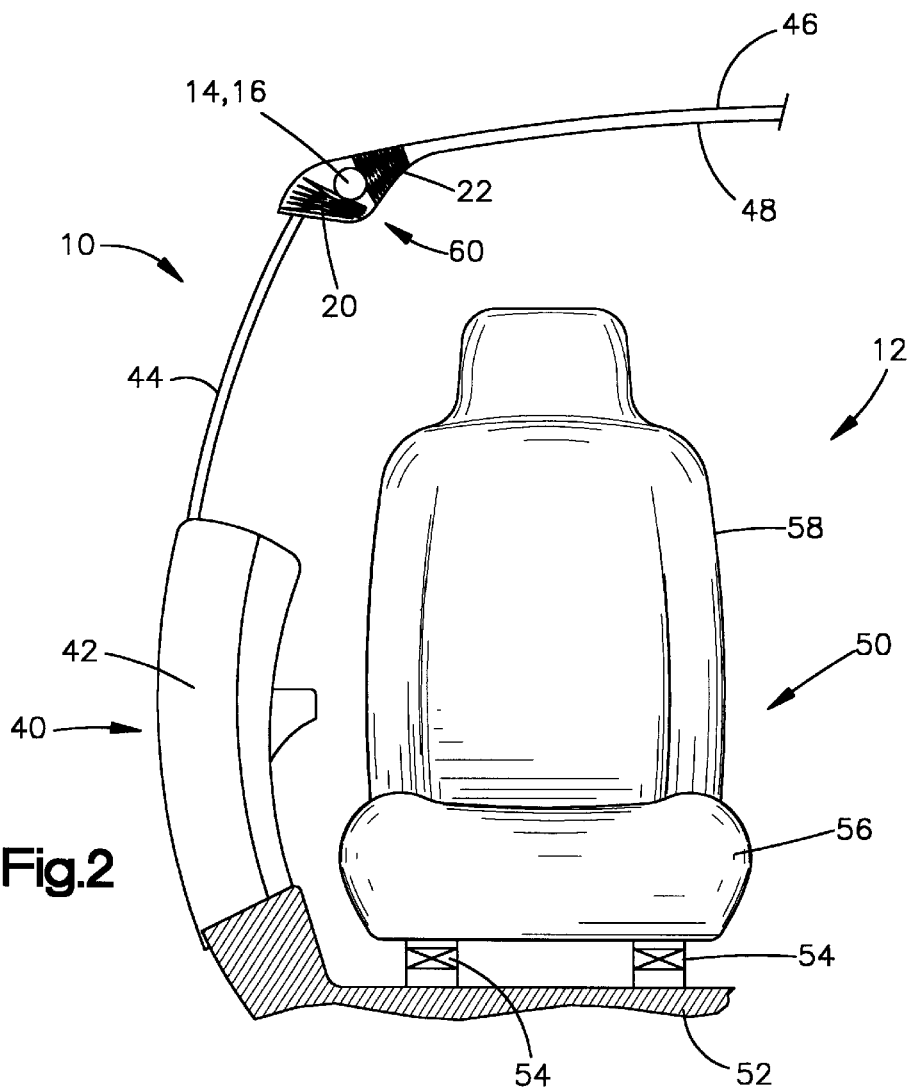
FIG. 2 is a front elevational view of a portion of a vehicle including the safety apparatus of FIG. 1.

The present invention relates to a vehicle occupant safety apparatus and, in particular, to a vehicle safety apparatus for helping to protect an occupant of a vehicle having a roof and a side structure. The present invention is applicable to various vehicle occupant safety apparatus constructions. As representative of the present invention, FIG. 1 illustrates schematically a vehicle occupant safety apparatus 10 for use in a vehicle 12 (FIG. 2).

The safety apparatus 10 (FIG. 1) includes first and second inflators 14 and 16, described below in more detail. The apparatus also includes first and second inflatable vehicle occupant protection devices in the form of a window air bag or side curtain 20 and a headliner air bag 22, both described below in more detail.

The safety apparatus 10 includes electrical circuitry including a sensor 30 for sensing a vehicle condition such as a side impact to the vehicle 12 or a vehicle rollover condition. The safety apparatus 10 also includes a controller 32 for actuating one or both of the inflators 14 and 16 in response to the output of the sensor 30. Upon the occurrence of a vehicle condition for which inflation of one or both of the air bags 20 and 22 is desired to help protect the occupant of the vehicle 12, the sensor 30 and the controller 32 cooperate to send an actuation signal to one or both of the inflators 14 and 16 over lead wires 34 and 36.

The vehicle 12 (FIG. 2) includes a side structure of which a portion is illustrated at 40. The side structure 40 includes a door 42 and a window 44. The vehicle also has a roof 46 inside of which is supported a headliner 48.

A seat 50 is supported on the vehicle floor 52 by tracks 54. The seat 50 includes a seat bottom cushion 56 and a seatback 58. When a vehicle occupant (not shown) sits in the seat 50, the occupant is adjacent to the vehicle door 42 and window 44. The side of the occupant's head is adjacent to the window 44. The top of the occupant's head is adjacent to the headliner 48.

The inflators 14 and 16 and the air bags 20 and 22 are mounted as a module 60 in the vehicle 12. As illustrated, the module 60 is mounted at the outboard side of the headliner 48, over the window 44. The module 60, or portions thereof including the inflators 14 and 16, may alternatively be mounted near the front of the vehicle 12, on or near the A-pillar, or at another location on the vehicle.

Figure 5:
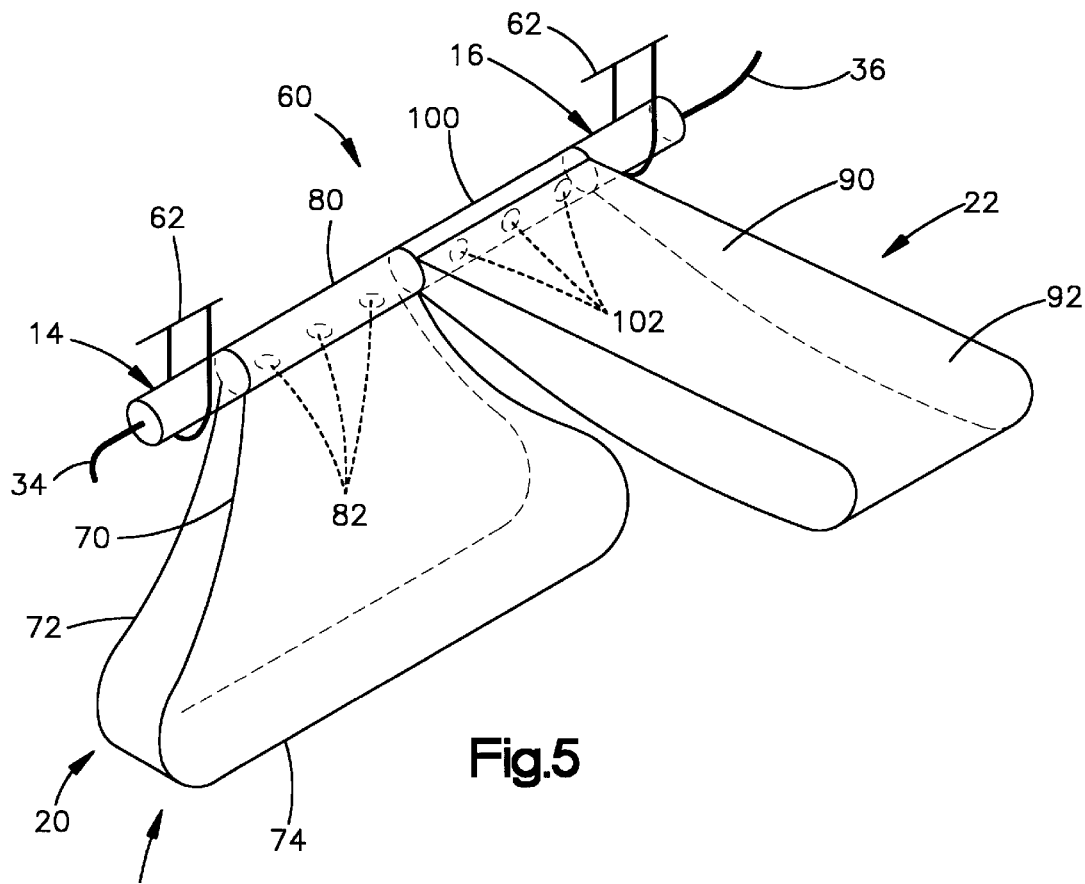
FIG. 5 is a schematic fragmentary view of a portion of the vehicle safety apparatus of FIG. 1.

The module 60 includes means illustrated schematically at 62 (FIG. 5) for mounting the inflators 14 and 16 and the air bags 20 and 22 to the vehicle 12. The mounting means 62 is generally of a known construction and therefore is not illustrated in detail. The mounting means 62 may include one or more brackets or other fasteners for securing the module 60 in position on the vehicle 12.

The first air bag 20, or window air bag, when inflated, extends generally downward in the vehicle 12 along the side of the window 44. The window air bag 20 has an upper end portion 70 secured to or adjacent the first inflator 14. A central portion 72 of the window air bag 20 extends between the window 44 and the occupant's head. A lower end portion 74 of the window air bag 20 extends inward of the door 42, at a location below the window 44, so that the inflated air bag can resist movement of the occupant in a direction out of the window opening.

The first inflator 14 preferably contains a stored quantity of pressurized inflation fluid in the form of gas to inflate the window air bag 20. The first inflator alternatively could contain a combination of pressurized inflation fluid and ignitable material for heating the inflation fluid, or could be a pyrotechnic inflator which uses the combustion of gas-generating material to generate inflation fluid.

The first inflator includes a diffuser 80. The diffuser 80 (not shown in detail) is preferably a metal member having a plurality of inflation fluid outlets 82 for directing inflation fluid into the window air bag 20. The diffuser 80 may be formed as a portion of the first inflator 14 or may be a separate member connected with or adjacent to the inflator.

The inflation fluid outlets 82 in the diffuser 80 are oriented in the vehicle 12 so that inflation fluid from the first inflator 14 flows in a predetermined direction into the window air bag 20 to inflate the air bag. Specifically, the inflation fluid outlets 82 are oriented in the vehicle 12 so that inflation fluid from the first inflator 14 flows in a direction to inflate the window air bag 20 between the window 44 and the vehicle occupant's head. This is a vertically downward direction when the vehicle 12 is in an upright orientation.

The second air bag 22, or headliner bag, when inflated, extends generally laterally in the vehicle 12, between the roof 46 and the headliner 48. The headliner bag 22 has an outer end portion 90 connected with or adjacent to the second inflator 16. A main body portion 92 of the headliner bag 22 is extendable between the roof 46 and the headliner 48, at a location above the seat 50 and the occupant's head, so that the inflated headliner bag 22 can help to protect the occupant's head.

The second inflator 16 is preferably similar in construction to the first inflator 14. The second inflator 16 includes a diffuser 100. The diffuser 100 (not shown in detail) is preferably a metal member having a plurality of inflation fluid outlets 102 for directing inflation fluid into the headliner bag 22. The inflation fluid outlets 102 are oriented in the vehicle 12 so that inflation fluid from the second inflator 16 flows in a predetermined direction into the headliner bag 22 to inflate the headliner bag. Specifically, the inflation fluid outlets 102 are oriented in the vehicle 12 so that inflation fluid from the second inflator 16 is directed generally laterally in the vehicle, to inflate the headliner bag 22 laterally between the roof 46 and the headliner 48, at a location above the seat 50 and the vehicle occupant's head. This is a generally horizontal direction when the vehicle 12 is in an upright orientation.

Figure 3:
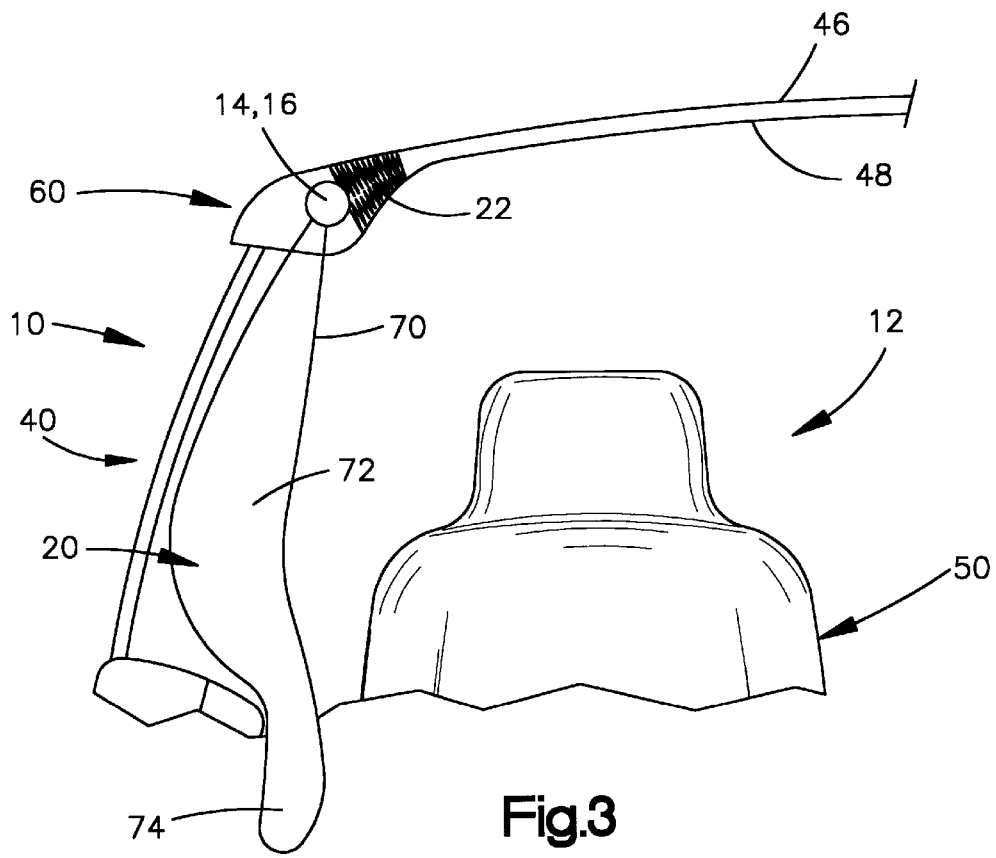
FIG. 3 is a view similar to FIG. 2 of the vehicle occupant safety apparatus including a window air bag shown in an inflated condition.
Figure 4:
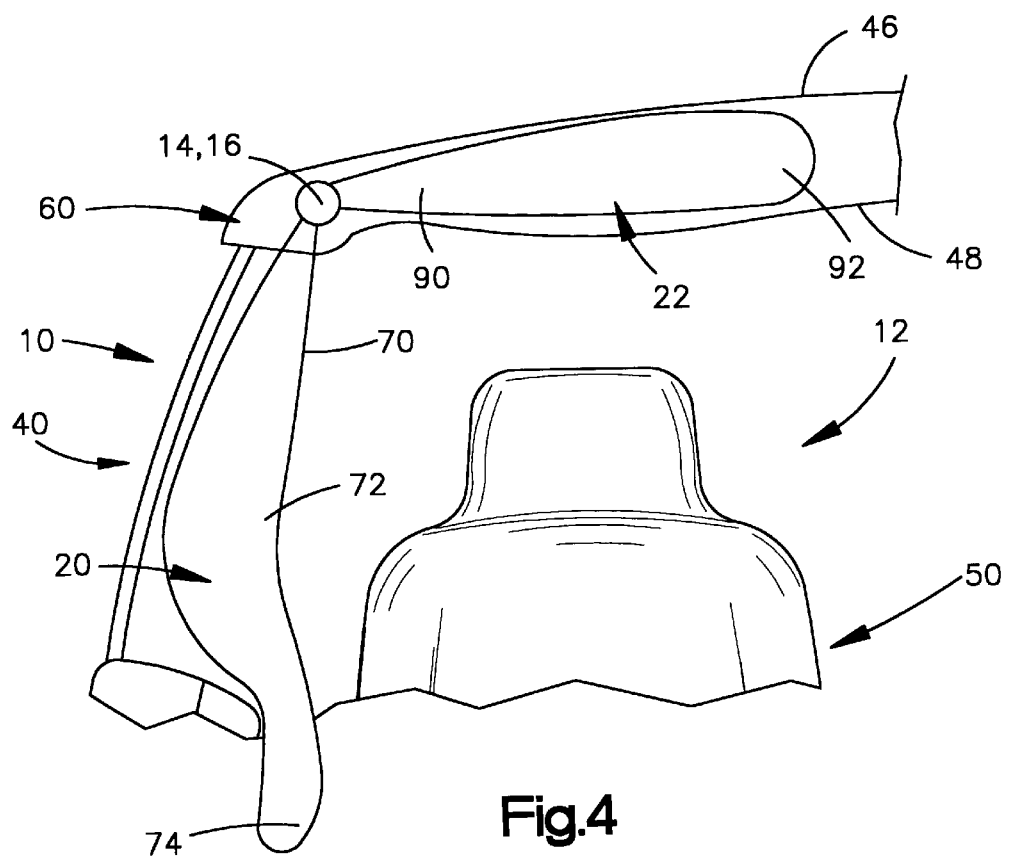
FIG. 4 is a view similar to FIG. 3 also showing a headliner air bag in an inflated condition.

Upon the occurrence of a vehicle condition, such as a side impact to the vehicle 12, for which it is desired to help protect the occupant of the seat 12, the first inflator 14 is actuated in a known manner by the controller 32. Inflation fluid is directed from the first inflator 14 through the diffuser outlets 82 of the diffuser 80 and into the window air bag 20. The window air bag 20 inflates generally vertically downward in the vehicle, between the window 44 and the vehicle occupant's head, as shown in FIG. 3.

If the vehicle electric circuitry, including the sensor 30 and the controller 32, determines that the vehicle 12 may be in a rollover condition, then the controller actuates the second inflator 16. When the second inflator 16 is actuated, inflation fluid is directed through the diffuser outlets 102 in the diffuser 100 and into the headliner air bag 22. The headliner air bag 22 inflates generally laterally in the vehicle, that is, between the roof 46 and the headliner 48, at a location above the vehicle occupant's head. The interposition of the headliner air bag 22 between the occupant's head and the vehicle roof 46 helps to protect the occupant from injury due to contact with the roof.

The second inflator 16 is actuated at a selected period of time after the actuation of the first inflator 14. This time delay is provided because a vehicle condition which requires protection of the top of the vehicle occupant's head, that is, a rollover condition, typically develops over a longer period of time than a side impact condition.

In addition, it may in some circumstances be desirable to actuate the second inflator 16, and inflate the headliner air bag 22, prior to (or even without) actuation of the first inflator 14. Thus, the sensor 30 may comprise separate sensors for sensing a side impact to the vehicle 12 and for sensing a rollover condition of the vehicle.

Figure 6:
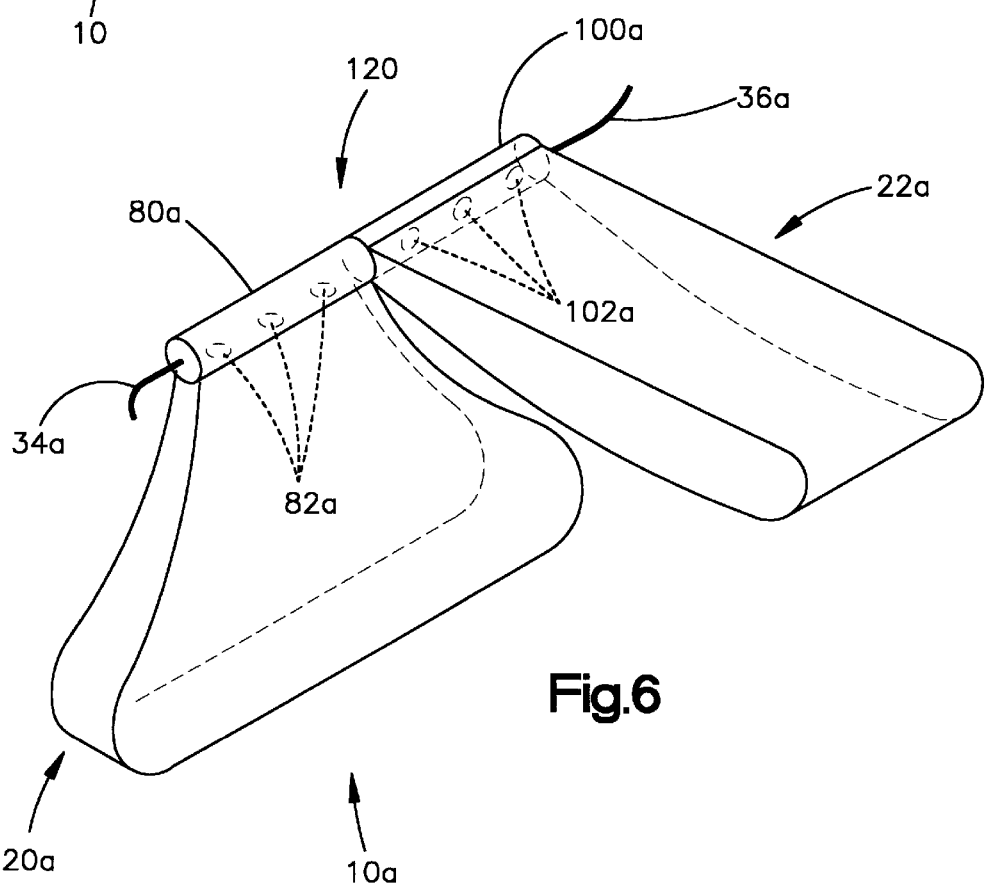
FIG. 6 is a schematic fragmentary view similar to FIG. 5 of a portion of a vehicle safety apparatus constructed in accordance with a second embodiment of the invention.

FIG. 6 is a schematic fragmentary view of a portion of a vehicle safety apparatus 10a constructed in accordance with a second embodiment of the invention. The safety apparatus 10a is similar in construction to the safety apparatus 10 (FIGS. 1–5) and similar parts are given the same reference numerals with the suffix "a" added for clarity.

The safety apparatus 10a includes a single inflator 120 rather than the two separate inflators 14 and 16 (FIG. 1) of the safety apparatus 10. The inflator 120 (FIG. 6) is a dual stage inflator which includes independently actuatable first and second stages. The first stage of the inflator 120, when actuated, emits inflation fluid under pressure through inflation fluid outlets 82a of a diffuser 80a. The second stage of the inflator 120, when actuated, emits inflation fluid under pressure through inflation fluid outlets 102a of a diffuser 100a. The single inflator 120, with the diffusers 80a and 100a, is mounted in the vehicle 12 in the same or a similar manner to the mounting of the inflators 14 and 16 as parts of the safety apparatus 10. From the above description of the invention, those skilled in the art will perceive improvements, changes and modifications in the invention. Such improvements, changes and modifications within the skill of the art are intended to be covered by the appended claims.

Having described the invention, I claim:

1. A vehicle occupant safety apparatus for helping to protect an occupant of a vehicle having a roof and a side structure, said apparatus comprising:

a first vehicle occupant protection device inflatable into a position between the side of the occupant's head and the vehicle side structure;

an actuatable first inflation fluid source for directing inflation fluid into said first inflatable device in a generally downward direction in the vehicle to inflate said first inflatable device entirely below the first inflation fluid source;

a second vehicle occupant protection device inflatable into a position between the top of the occupant's head and the vehicle roof and overlying the top of the occupant's head;

a second inflation fluid source actuatable independently of said first inflation fluid source for directing inflation fluid into said second inflatable device to inflate said second inflatable device; and control means responsive to at least one sensed vehicle condition for selectively actuating one or both of said first and second inflation fluid sources.

2. An apparatus as defined in claim 1 wherein said control means selectively actuates said second inflation fluid source at a selected time after actuation of said first inflation fluid source.

3. An apparatus as defined in claim 1 wherein said control means comprises sensor means for sensing at least one vehicle condition and controller means for selectively providing an inflator actuation signal in response to said sensor means sensing the at least one vehicle condition.

4. An apparatus as defined in claim 3 wherein said sensor means is operative to sense a side impact condition of the vehicle and a rollover condition of the vehicle.

5. An apparatus as defined in claim 1 wherein said first vehicle occupant protection device is a window air bag inflatable into a position between the vehicle occupant and a window of the vehicle, and said second vehicle occupant protection device is a headliner air bag inflatable into a position between the vehicle occupant and a roof of the vehicle.

6. An apparatus as defined in claim 5 wherein the vehicle includes a headliner supported on the vehicle roof, said headliner air bag being inflatable into a position between the vehicle headliner and the roof of the vehicle.

7. An apparatus as defined in claim 5 wherein said first inflation fluid source comprises means for directing inflation fluid to flow from said first inflation fluid source in a generally downward direction in the vehicle to inflate said window air bag in a generally downward direction in the vehicle, and said second inflation fluid source comprises means for directing inflation fluid to flow from said second inflation fluid source in a lateral direction in the vehicle to inflate said headliner air bag in a lateral direction in the vehicle.

8. An apparatus as defined in claim 1 wherein said first and second inflation fluid sources comprise first and second stages of a single inflator.

9. An apparatus as defined in claim 1 wherein said first and second inflation fluid sources comprise first and second inflators.

10. A vehicle occupant safety apparatus for helping to protect an occupant of a vehicle having a roof, a headliner supported on the roof, and a side structure including a window, said apparatus comprising:

a first vehicle occupant protection device having a deflated condition wherein said first protection device is stored along an outboard side of said headliner above the vehicle window, said first protection device being inflatable into a position between the side of the occupant's head and the vehicle side structure;

an actuatable first inflation fluid source for directing inflation fluid into said first inflatable device to inflate said first inflatable device;

a second vehicle occupant protection device having a deflated condition wherein said second protection device is stored along said outboard side of said headliner above the vehicle window, said second protection device being inflatable into a position between the top of the occupant's head and the vehicle roof and overlying the top of the occupant's head;

a second inflation fluid source actuatable independently of said first inflation fluid source for directing inflation fluid into said second inflatable device to inflate said second inflatable device; and control means responsive to at least one sensed vehicle condition for actuating said first and second inflation fluid sources.

11. An apparatus as defined in claim 10 wherein said control means selectively actuating one or both of said first and second inflation fluid sources.

12. An apparatus as defined in claim 11 wherein said control means selectively actuates said second inflation fluid source at a selected time after actuation of said first inflation fluid source.

13. An apparatus as defined in claim 10 wherein said control means comprises sensor means for sensing at least one vehicle condition and controller means for selectively providing an inflator actuation signal in response to said sensor means sensing the at least one vehicle condition.

14. An apparatus as defined in claim 13 wherein said sensor means is operative to sense a side impact condition of the vehicle and a rollover condition of the vehicle.

15. An apparatus as defined in claim 10 wherein said first inflatable device is a window air bag inflatable into a position between the vehicle occupant and a window of the vehicle, and said second inflatable device is a headliner air bag inflatable into a position between the vehicle occupant and a roof of the vehicle.

16. An apparatus as defined in claim 15 wherein the vehicle includes a headliner supported on the vehicle roof, said headliner air bag being inflatable into a position between the vehicle headliner and the roof of the vehicle.

17. An apparatus as defined in claim 15 wherein said first inflation fluid source comprises means for directing inflation fluid to flow from said first inflation fluid source in a generally downward direction in the vehicle to inflate said window air bag in a generally downward direction in the vehicle, and said second inflation fluid source comprises means for directing inflation fluid to flow from said second inflation fluid source in a lateral direction in the vehicle to inflate said headliner air bag in a lateral direction in the vehicle.

18. An apparatus as defined in claim 10 wherein said first and second inflation fluid sources comprise first and second stages of a single inflator.

19. An apparatus as defined in claim 10 wherein said first and second inflation fluid sources comprise first and second inflators.

20. A vehicle occupant safety apparatus for helping to protect an occupant of a vehicle having a side structure, a roof, and a headliner supported on the roof, said apparatus comprising:

a first vehicle occupant protection device inflatable into a position between the side of the occupant's head and the vehicle side structure;

an actuatable first inflation fluid source for directing inflation fluid into said first inflatable device to inflate said first inflatable device;

a second vehicle occupant protection device inflatable between the vehicle roof and the vehicle headliner into a position between the top of the occupant's head and the vehicle roof and overlying the top of the occupant's head;

a second inflation fluid source actuatable independently of said first inflation fluid source for directing inflation fluid into said second inflatable device to inflate said second inflatable device; and control means responsive to at least one sensed vehicle condition for actuating said first and second inflation fluid sources;

wherein said first inflatable device is a window air bag inflatable into a position between the vehicle occupant and a window of the vehicle, and second inflatable device is a headliner air bag inflatable into a position between the vehicle occupant and a roof of the vehicle;

wherein said first inflation fluid source comprises means for directing inflation fluid to flow from said first inflation fluid source in a generally downward direction in the vehicle to inflate said first inflatable device in a generally downward direction in the vehicle entirely below the first inflation fluid source, and said second inflation fluid source comprises means for directing inflation fluid to flow from said second inflation fluid source in a lateral direction in the vehicle to inflate said second inflatable device in a lateral direction in the vehicle.

21. An apparatus as defined in claim 20 wherein said control means selectively actuates one or both of said first and second inflation fluid sources.

22. An apparatus as defined in claim 21 wherein said control means selectively actuates said second inflation fluid source at a selected time after actuation of said first inflation fluid source.

23. An apparatus as defined in claim 20 wherein said control means comprises sensor means for sensing at least one vehicle condition and controller means for selectively providing an inflator actuation signal in response to said sensor means sensing the at least one vehicle condition.

24. An apparatus as defined in claim 20 wherein said sensor means is operative to sense a side impact condition of the vehicle and a rollover condition of the vehicle.

25. An apparatus as defined in claim 20 wherein the vehicle includes a headliner supported on the vehicle roof and the side structure includes windows, said first and second vehicle occupant protection devices having a deflated condition wherein said first and second protection devices are stored along an outboard side of said headliner above the vehicle window.

26. An apparatus as defined in claim 20 wherein said first and second inflation fluid sources comprise first and second stages of a single inflator.

27. An apparatus as defined in claim 20 wherein said first and second inflation fluid sources comprise first and second inflators.

28. A vehicle occupant safety apparatus for helping to protect an occupant of a vehicle having a roof, a headliner supported on the roof, and a side structure including a window, said apparatus comprising:

a first vehicle occupant protection device inflatable into a position between the side of the occupant's head and the vehicle side structure;

an actuatable first inflation fluid source for directing inflation fluid into said first inflatable device to inflate said first inflatable device;

a second vehicle occupant protection device inflatable into a position between the top of the occupant's head and the vehicle roof and overlying the top of the occupant's head;

a second inflation fluid source actuatable independently of said first inflation fluid source for directing inflation fluid into said second inflatable device to inflate said second inflatable device; and control means responsive to at least one sensed vehicle condition for selectively actuating one or both of said first and second inflation fluid sources;

said first and second vehicle occupant protection devices having a deflated condition wherein said first and second protection devices are stored along an outboard side of said headliner above the vehicle window.

29. A vehicle occupant safety apparatus for helping to protect an occupant of a vehicle having a roof, a headliner supported on the roof, and a side structure including a window, said apparatus comprising:

a first vehicle occupant protection device inflatable into a position between the side of the occupant's head and the vehicle side structure;

an actuatable first inflation fluid source for directing inflation fluid into said first inflatable device to inflate said first inflatable device;

a second vehicle occupant protection device inflatable between the vehicle roof and the vehicle headliner into a position between the top of the occupant's head and the vehicle roof and overlying the top of the occupant's head;

a second inflation fluid source actuatable independently of said first inflation fluid source for directing inflation fluid into said second inflatable device to inflate said second inflatable device; and control means responsive to at least one sensed vehicle condition for actuating said first and second inflation fluid sources;

said first and second vehicle occupant protection devices having a deflated condition wherein said first and second protection devices are stored along an outboard side of said headliner above the vehicle window.

* * * * *